United States Patent
van Thiel et al.

(10) Patent No.: US 12,384,343 B2
(45) Date of Patent: Aug. 12, 2025

(54) ELECTRICALLY CONTROLLABLE PNEUMATIC BRAKE SYSTEM HAVING A TWO-CHANNEL PRESSURE MODULATOR SYSTEM

(71) Applicant: ZF CV Systems Global GmbH, Bern (CH)

(72) Inventors: Julian van Thiel, Grossburgwedel (DE); Oliver Wulf, Neustadt (DE)

(73) Assignee: ZF CV Systems Global GmbH, Bern (CH)

( * ) Notice: Subject to any disclaimer, the term of this patent is extended or adjusted under 35 U.S.C. 154(b) by 524 days.

(21) Appl. No.: 17/833,457

(22) Filed: Jun. 6, 2022

(65) Prior Publication Data

US 2022/0297652 A1 Sep. 22, 2022

Related U.S. Application Data

(63) Continuation of application No. PCT/EP2020/084044, filed on Dec. 1, 2020.

(30) Foreign Application Priority Data

Dec. 4, 2019 (DE) ...................... 10 2019 133 012.2

(51) Int. Cl.
*B60T 8/94* (2006.01)
*B60T 7/12* (2006.01)
(Continued)

(52) U.S. Cl.
CPC ................. *B60T 8/94* (2013.01); *B60T 7/12* (2013.01); *B60T 13/36* (2013.01); *B60T 13/683* (2013.01);
(Continued)

(58) Field of Classification Search
CPC ...................................................... B60T 13/36
See application file for complete search history.

(56) References Cited

U.S. PATENT DOCUMENTS 9,327,695 B2 * 5/2016 Lauser .................. B60T 8/1766
2017/0210365 A1   7/2017 Luelfing et al.
(Continued)

FOREIGN PATENT DOCUMENTS

CN   106458196 A   2/2017
CN   107750214 A   3/2018
(Continued)

OTHER PUBLICATIONS

International Search Report of the European Patent Office dated Feb. 19, 2021 for international application PCT/EP2020/084044 on which this application is based.
(Continued)

*Primary Examiner* — Melody M Burch
(74) *Attorney, Agent, or Firm* — Walter Ottesen, P.A.

(57) ABSTRACT

An electrically controllable pneumatic brake system has a front and a rear axle brake circuit, and a manually actuable brake signal transmitter which, upon actuation, outputs a first front brake control pressure and a first rear brake control pressure. A front axle brake pressure is produced based on a front axle braking demand pressure and a rear axle brake pressure is produced based on a rear braking demand pressure. A two-channel pressure modulator system is configured to receive a braking demand signal from an autonomous driving unit and, in response thereto, output the front and rear braking demand pressure, and is further configured to receive the first front and rear brake control pressure and, at least in an error situation, to output the front braking demand pressure depending on the first front brake control
(Continued)

pressure and/or the rear braking demand pressure depending on the first rear brake control pressure.

18 Claims, 5 Drawing Sheets

(51) Int. Cl.
  *B60T 13/36* (2006.01)
  *B60T 13/68* (2006.01)
(52) U.S. Cl.
  CPC ... *B60T 2270/402* (2013.01); *B60T 2270/404* (2013.01); *B60T 2270/413* (2013.01); *B60T 2270/82* (2013.01); *B60T 2270/88* (2013.01)

(56) References Cited

U.S. PATENT DOCUMENTS

| | | |
|---|---|---|
| 2017/0267221 A1 | 9/2017 | Hecker et al. |
| 2018/0170330 A1 | 6/2018 | Wieder et al. |
| 2019/0152459 A1 | 5/2019 | Dieckmann et al. |
| 2019/0193705 A1 | 6/2019 | Wulf |
| 2019/0248346 A1 | 8/2019 | Wulf |
| 2019/0248350 A1 | 8/2019 | Wulf |
| 2019/0248351 A1 | 8/2019 | Wulf |
| 2019/0337503 A1 | 11/2019 | Otremba |
| 2020/0023820 A1 | 1/2020 | Van Thiel |
| 2020/0023827 A1 | 1/2020 | Van Thiel |
| 2020/0055511 A1 | 2/2020 | Schwagmeyer et al. |
| 2020/0070795 A1 | 3/2020 | Van Thiel |
| 2020/0139952 A1 | 5/2020 | Van Thiel |
| 2020/0148180 A1 | 5/2020 | Van Thiel |
| 2021/0171062 A1 | 6/2021 | Hecker et al. |

FOREIGN PATENT DOCUMENTS

| | | | |
|---|---|---|---|
| CN | 107921945 A | 4/2018 | |
| DE | 10 2014 013 756 B3 | 2/2016 | |
| DE | 10 2016 005 318 A1 | 11/2017 | |
| DE | 10 2016 010 461 A1 | 3/2018 | |
| DE | 10 2016 010 462 A1 | 3/2018 | |
| DE | 10 2016 010 463 A1 | 3/2018 | |
| DE | 10 2016 010 464 A1 | 3/2018 | |
| DE | 10 2017 002 716 A1 | 9/2018 | |
| DE | 10 2017 002 718 A1 | 9/2018 | |
| DE | 10 2017 002 719 A1 | 9/2018 | |
| DE | 10 2017 002 721 A1 | 9/2018 | |
| DE | 10 2017 005 979 A1 | 9/2018 | |
| DE | 10 2017 003 782 A1 | 10/2018 | |
| DE | 10 2017 010 716 A1 | 5/2019 | |
| EP | 3025919 A1 * | 6/2016 | ............. B60T 11/28 |
| JP | H10278763 A * | 10/1998 | |
| WO | WO-0192079 A1 * | 12/2001 | ............. B60T 8/349 |

OTHER PUBLICATIONS

Translation and Written Opinion of the International Searching Authority dated Feb. 19, 2021 for international application PCT/EP2020/084044 on which this application is based.

English translation and Office Action of the Chinese Patent Office dated May 1, 2024 in corresponding Chinese patent application No. 202080082371.2.

\* cited by examiner

ELECTRICALLY CONTROLLABLE PNEUMATIC BRAKE SYSTEM HAVING A TWO-CHANNEL PRESSURE MODULATOR SYSTEM

CROSS REFERENCE TO RELATED APPLICATIONS

This application is a continuation application of international patent application PCT/EP2020/084044, filed Dec. 1, 2020 designating the United States and claiming priority from German application 10 2019 133 012.2, filed Dec. 4, 2019, and the entire content of both applications is incorporated herein by reference.

TECHNICAL FIELD

The disclosure relates to an electrically controllable pneumatic brake system for a vehicle, in particular utility vehicle, having a front axle brake circuit for a front axle of the vehicle with a first compressed air supply and front axle brake actuators, a rear axle brake circuit for at least one rear axle of the vehicle with a second compressed air supply and rear axle brake actuators, and a manually actuable brake signal transmitter which is connected to the first and to the second compressed air supply and, upon actuation, outputs a first front axle brake control pressure and a first rear axle brake control pressure, wherein the front axle brake circuit has a front axle relay valve which is connected to the first compressed air supply and is configured, upon receipt of a front axle braking demand pressure, to output a front axle brake pressure to the front axle brake actuators, and wherein the rear axle brake circuit has a rear axle relay valve which is connected to the second compressed air supply and is configured, upon receipt of a rear axle braking demand pressure, to output a rear axle brake pressure to the rear axle brake actuators.

Furthermore, the disclosure relates to a vehicle having such an electrically controllable pneumatic brake system.

BACKGROUND

In modern electronically controllable pneumatic brake systems, which are used in particular in utility vehicles that are intended for autonomous driving, it is important to provide measures that allow safe deceleration of the utility vehicle even in the event of a fault in the brake system. Approaches here include using fully redundant brake systems, partially redundant brake systems or only different levels in one brake system, such that, in the event of a fault in a first level, the brake system can continue to be operated, at least with restrictions, in a second level.

However, if a double fault occurs, for example, which affects both the primary brake system and the redundant brake system, there is the risk that the utility vehicle can no longer be braked in a controlled manner. In such situations, there is a need to provide a system that allows safe deceleration of the vehicle.

A system that is aimed in particular at achieving high residual availability is known, for example, from US 2017/0267221. The document discloses electrically equipping a vehicle with an at least partially electric braking and steering device, which comprises: an electric or electromechanical steering device, which is connected to a steering gear and which comprises an electronic steering control device and an electric steering actuator, and a service brake device. As a service brake device, US 2017/0267221 proposes an electropneumatic service brake device which comprises an electropneumatic service brake valve device, an electronic brake control device, electropneumatic modulators, and pneumatic wheel brake actuators, wherein the electronic brake control device electrically controls the electropneumatic modulators in order to generate pneumatic brake pressures or brake control pressures for the pneumatic wheel brake actuators on a wheel-specific, axle-specific or side-specific basis. The electropneumatic service brake valve device has a service brake actuation element and also, within an electrical service brake circuit, an electrical channel with an electrical brake signal transmitter that can be actuated by the service brake actuation element. Furthermore, an electronic evaluation device is provided which receives the actuation signals and, in a manner dependent on the actuation signals, inputs braking demand signals into the electronic brake control device and, within at least one pneumatic service brake circuit, comprises at least one pneumatic channel, in which actuation of the service brake actuation element owing to a driver's braking demand causes at least one control piston of the service brake valve device to be loaded with a first actuating force and, in response to this, the control piston makes it possible to generate pneumatic brake pressures or brake control pressures for the pneumatic wheel brake actuators. The electronic evaluation device of the electropneumatic service brake valve device furthermore comprises electronic control means for generating, independently of a driver's braking demand, a second actuating force which, in the presence of a braking demand that is independent of the driver's request, acts on the control piston in the same direction as or in the opposite direction to the first actuating force. The electropneumatic service brake device is supplied by an electrical power source which is independent of a second electrical power source which supplies the electropneumatic service brake valve device with electrical power. It is hereby ensured that, as far as possible, always at least one of the two systems is functional. The electric or electropneumatic steering device is supplied with power by the second electrical power source. It is sought in this way to achieve high residual availability. However, the system is complex and thus cannot be readily implemented in every utility vehicle.

A system that provides electronically pneumatically controlled redundancy is disclosed in US 2019/0152459. The system disclosed in the document uses a bypass valve in order, depending on the failure of a subsystem, to transmit control pressures in order thus to provide an at least pneumatic supply to the circuit in which an electrical failure has respectively occurred. This, too, increases the residual availability. Similar systems are disclosed in US 2019/0193705 and in US 2019/0248351.

Furthermore, US 2019/0248350 discloses a system and a method in which pilot control valves are electronically controlled by way of a redundancy signal if a failure or a defect is detected in the electronic control of wheel brakes of the brake system. Here, the system seeks to prevent the wheels from locking. US 2020/0023820, US 2020/0023827, US 2020/0070795 and US 2020/0148180 have disclosed systems in which a redundancy is generated pneumatically in each case. Here, different output brake pressures, for example front axle, rear axle or trailer brake pressures, are used in order to be provided as redundancy pressure to failed systems, such as for example the front axle brake circuit, rear axle brake circuit, parking brake circuit or trailer brake circuit. In this way, a subordinate pneumatic redundancy level is generated, such that high residual availability is likewise achieved.

Furthermore, systems also exist which incorporate the trailer, as disclosed for example in US 2019/0248346.

SUMMARY

It is an object of the disclosure to equip an existing brake system of the type mentioned at the beginning with a homogeneous, fault-tolerant interface for electrified automated braking.

This object can, for example, be achieved by a two-channel pressure modulator system being provided in the electrically controllable pneumatic brake system, which is connected between the brake signal transmitter and the front and rear axle relay valve, the two-channel pressure modulator system being configured to receive an electronic braking demand signal from a unit for autonomous driving and, in response thereto, to output the front axle braking demand pressure and the rear axle braking demand pressure, and wherein the pressure modulator system is furthermore configured to receive the first front axle brake control pressure and the first rear axle brake control pressure and, at least in a fault situation of an electronic component of the pressure modulator system, to output the front axle braking demand pressure depending on the first front axle brake control pressure and/or the rear axle braking demand pressure depending on the first rear axle brake control pressure. The two-channel pressure modulator system therefore forms an interface both for the brake signal transmitter and for the unit for autonomous driving.

In the electrically controllable pneumatic brake system described here, instead of single- or two-channel modulators on the front and rear axles only relay valves are provided, namely the front axle relay valve and the rear axle relay valve, which, on the basis of a received control pressure, namely the front axle braking demand pressure or the rear axle braking demand pressure, output corresponding brake pressures to front axle brake actuators or rear axle brake actuators. In a conventional brake system which is operated pneumatically on the front and rear axles, the front axle braking demand pressure and the rear axle braking demand pressure are output via the manually actuable brake signal transmitter, which is generally a foot brake pedal. According to the disclosure, there is now arranged in between them the two-channel pressure modulator system which then takes on the outputting of the rear axle and front axle braking demand pressure and then receives the front axle and rear axle brake control pressure from the manually actuable brake signal transmitter such that the pressure modulator system can process the pressures if electronic components of the pressure modulator system fail. This achieves a redundancy which permits high residual availability and at the same time builds up on components of existing brake systems.

The two-channel pressure modulator system can be partially integrated or fully integrated here, for example can be formed from one, two or more constructional units. Preferably, as few different components as possible are provided, so that the assembly and the installation in the vehicle are simplified as a whole. However, it is also important to note that installation space is used efficiently, and therefore there may also be applications in which a plurality of individual components are preferred in order to simplify the accommodating in the vehicle.

In accordance with the configuration of the brake system, the front axle braking demand pressure is merely boosted in terms of volume by the front axle relay valve in order to provide the front axle brake pressure. Similarly, the rear axle relay valve can preferably also be configured merely to boost the rear axle braking demand pressure in terms of volume and then to provide same as rear axle brake pressure. Both the front axle relay valve and the rear axle relay valve do not have their own intelligence, but rather are provided only for boosting the corresponding control pressures in terms of volume.

In a first embodiment, the two-channel pressure modulator system is configured to output the front axle braking demand pressure depending on the first front axle brake control pressure and/or the rear axle braking demand pressure depending on the first rear axle brake control pressure whenever at least one of the first front axle brake control pressure and of the first rear axle brake control pressure initiates a higher braking demand pressure and/or rear axle braking demand pressure than the front axle braking demand pressure and/or rear axle braking demand pressure demanded by the electronic braking demand signal. In this embodiment, the first front axle brake control pressure and the first rear axle brake control pressure are therefore used not only in the event of a redundancy, if an electronic component of the two-channel pressure modulator system has a fault, but also in the event that they demand a higher front axle braking demand pressure or rear axle braking demand pressure than the electronic braking demand signal provided by the unit for autonomous driving. The vehicle driver is therefore capable of manually overriding the electronic braking demand signal output by the unit for autonomous driving and to initiate more powerful braking than the unit for autonomous driving would do. By this means, the safety of the electronically controllable pneumatic brake system as a whole can be improved and the driver can intervene in the braking operation in a simple manner.

In an embodiment, the two-channel pressure modulator system has, for a first channel, a first primary modulator and a first secondary modulator which are pneumatically connected in series and has, for a second channel, a second primary modulator and a second secondary modulator which in turn are pneumatically connected in series. In this embodiment, the respective first and second primary modulators can be provided to control the brake system in an operating situation, while the first and second secondary modulators are provided essentially for a redundancy situation, if a fault occurs in the brake system and/or in the two-channel pressure modulator system. The first and second primary modulators can preferably each be arranged pneumatically downstream of the first and second secondary modulators, that is, the first and second secondary modulators can preferably be arranged pneumatically between the brake signal transmitter and the first and second primary modulators.

Furthermore, it can preferably be provided that the first primary modulator has a first electronic control unit and the second primary modulator has a second electronic control unit which each receive the electronic braking demand signal, the first primary modulator being configured, in response to receiving the electronic braking demand signal, to output the front axle braking demand pressure, and the second primary modulator being configured, in response to receiving the electronic braking demand signal, to output the rear axle braking demand pressure. In more precise terms, this task is taken on by the first and second electronic control units which each convert the braking demand signal and control valves of the first and second primary modulators in such a manner that the front axle braking demand pressure and rear axle braking demand pressure are output. By contrast, the first and second secondary modulators preferably do not have their own intelligence and are controlled directly by a control unit of the brake system, for example by the first and second control units, of a superordinate central control unit, the unit for autonomous driving or the like. The first and second secondary modulators may also be configured to be purely pneumatic, without electrically switchable valves.

However, it can be preferred that the first secondary modulator has one or more first electromagnetically switchable secondary valves which are electrically connected to the second electronic control unit in order to receive switching signals therefrom, and that the second secondary modulator has one or more second electromagnetically switchable secondary valves which are electrically connected to the first electronic control unit in order to receive switching signals therefrom. In this way, the two channels are interconnected electrically. The second electronic control unit, which belongs to the second primary modulator of the second channel, controls the first secondary modulator, which belongs to the first channel, and vice versa. Redundancy can be reproduced even better in this way. If, for example, in a fault situation, the first electronic control unit of the first primary modulator has failed, it is possible for the second electronic control unit of the second primary modulator then to switch the first secondary modulator in such a manner that ultimately the front axle braking demand pressure and rear axle braking demand pressure continue to be output. Even in the reverse situation, if the first electronic control unit of the first primary modulator fails, the second electronic control unit of the second primary modulator can control the first secondary modulator in order thus to continue to output the front axle braking demand pressure and rear axle braking demand pressure and to brake the vehicle.

In a further embodiment, it is provided that the first secondary modulator has a first secondary supply port for receiving supply pressure, a first secondary redundancy port for receiving the first front axle brake control pressure from the brake signal transmitter, and a first secondary working port for outputting a second front axle brake control pressure to the first primary modulator. In a corresponding manner, the second secondary modulator preferably also has a second secondary supply port for receiving supply pressure, a second secondary redundancy port for receiving the first rear axle brake control pressure from the brake signal transmitter, and a second secondary working port for outputting a second rear axle brake control pressure to the second primary modulator. The first secondary supply port and the second secondary supply port can be connected to the same compressed air supply or to two different compressed air supplies which are then provided for a front axle brake circuit and a rear axle brake circuit. Preferably, the first secondary supply port can be connected to a compressed air supply for the front axle brake circuit, and the second secondary supply port is connected to a compressed air supply for a rear axle brake circuit. The outputting of the second front axle brake control pressure and of the second rear axle brake control pressure serves in particular, in a redundancy situation, if the first and second electronic control units of the first and second primary modulators fail, to control them pneumatically.

Particularly preferably, the first and second secondary redundancy ports are open with respect to the brake signal transmitter during normal operation. It is conventionally provided that redundancy ports on modulators can be shut off by a switching valve such that the pressure output there is not processed further. However, according to the embodiment described here, the first and second secondary redundancy ports are open during normal operation and preferably receive the pressure output by the brake signal transmitter, that is, the first secondary redundancy port continuously receives the first front axle brake control pressure and the second secondary redundancy port continuously receives the first rear axle brake control pressure. In this way, a "hot redundancy" can be formed which permits the brake pressure demanded by the electronic braking demand signal to be overridden. Accordingly, the processing of the first front axle brake control pressure and of the first rear axle brake control pressure also takes place during normal operation and not only if a redundancy situation, that is, a fault in the brake system, has occurred.

In a further embodiment, it is provided that the first primary modulator has a first primary supply port for receiving supply pressure, a first primary redundancy port for receiving the second front axle brake control pressure, and a first primary working port for outputting the front axle braking demand pressure to the front axle relay valve. In a corresponding manner, the second primary modulator preferably also has a second primary supply port for receiving supply pressure, a second primary redundancy port for receiving the second rear axle brake control pressure, and a second primary working port for outputting the rear axle brake demand pressure to the rear axle relay valve. The first primary supply port is preferably connected to a first compressed air supply, and the second primary supply port is preferably connected to a second compressed air supply. The first compressed air supply is preferably provided for the front axle and for a front axle brake circuit, while the second compressed air supply is provided for the rear axle and the rear axle brake circuit. However, it can also be provided that both the first primary supply port and the second primary supply port are connected to the same compressed air supply. In addition, embodiments are preferred in which the first primary redundancy port does not receive the second front axle brake control pressure, but rather the first front axle brake control pressure, and the second primary redundancy port does not receive the second rear axle brake control pressure, but rather the first rear axle brake control pressure. In these cases, the first and second primary modulators are connected directly to the brake signal transmitter, without pneumatic interconnection of the first and second secondary modulators. Furthermore, it is also conceivable for the first primary modulator to receive the second rear axle brake control pressure at its first primary redundancy port, and for the second primary modulator to receive the second front axle brake control pressure at its second primary redundancy port. In this way, a further crosswise connection of the modulators is achieved, with separation of the circuits no longer being able to be completely reproduced in such a case.

Preferably, it is furthermore provided that the first primary modulator locks out the second front axle brake control pressure if, in response thereto, a lower front axle braking demand pressure is output than the front axle braking demand pressure demanded by the electronic braking demand signal. At the same time, it is preferably furthermore provided that the second primary modulator locks out the second rear axle brake control pressure if, in response thereto, a lower rear axle braking demand pressure is output than the rear axle braking demand pressure demanded by the electronic braking demand signal. Accordingly, it is provided that the front axle and rear axle brake control pressures which are provided by the first and second secondary modulators are locked out at the primary modulators only if the electronic braking demand signal demands a higher brake pressure than the brake pressure demanded by the first and second secondary modulators, that is, ultimately by the manual brake signal transmitter. That is, as a result, use is in each case made of the braking demand signal, either the electronic braking demand signal or the pressures demanded by the manually actuable brake signal transmitter, that leads or lead to a higher brake pressure. The safety of the brake system as a whole can thereby be improved. By locking out the low pressure, it is then ensured that no duplication occurs which may lead to an inadvertent locking of wheels or axles.

It is preferably furthermore provided that the first primary modulator has a first primary pressure sensor which is connected downstream of the first primary redundancy port in order to detect the pressure present at the first primary redundancy port and to provide a corresponding first pressure signal to the first electronic control unit. Furthermore, the second primary modulator preferably has a secondary primary pressure sensor which is connected downstream of the second primary redundancy port in order to detect the pressure present at the second primary redundancy port and to provide a corresponding second pressure signal to the second electronic control unit. The first and second pressure signals can be used to measure the magnitude of the pressure which is output by the manually actuable brake signal transmitter via the first and second secondary modulators to the first and second primary modulators. The electronic control units of the primary modulators can then decide, on the basis of the first and second pressure signals, whether the brake pressure demanded by the manual brake signal transmitter is higher than that which is demanded by the electronic braking demand signal from the unit for autonomous driving. Depending on the magnitude of the pressure present at the first and second primary redundancy ports, the first and second electronic control units of the first and second primary modulators can then block the respective primary redundancy port in order to prevent pressure from being output.

Furthermore, it is preferred that the electronically controllable pneumatic brake system has a first braking request pressure sensor for detecting the first front axle brake control pressure and a second braking request pressure sensor for detecting the first rear axle brake control pressure. These first and second braking request pressure sensors are connected preferably pneumatically between the brake signal transmitter and the respective first and second secondary modulators in order to detect the first front axle brake control pressure or first rear axle brake control pressure output by the brake signal transmitter. Also via them, a superordinate electronic control unit, or the first and second electronic control units of the first and second primary modulators, can decide whether the brake pressure demanded via the electronic braking demand signal is higher from the brake signal transmitter or from the unit for autonomous driving.

According to a further embodiment, it is provided that the first braking request pressure sensor provides a third pressure signal to the second electronic control unit, and the second braking request pressure sensor provides a fourth pressure signal to the first electronic control unit. In this way, the first electronic control unit obtains information regarding the magnitude of the first rear axle brake control pressure that is output for the second channel from the brake signal transmitter. Conversely, the second electronic control unit also receives information about the magnitude of the first front axle brake control pressure which is output to the first channel by the brake signal transmitter. This is particularly preferred if, for example, one of the electronic control units fails. If, for example, the second electronic control unit fails, the first electronic control unit receives information regarding the magnitude of the first rear axle brake control pressure output by the vehicle driver via the brake signal transmitter, and therefore, in this case, the first electronic control unit can electronically control the second secondary modulator in order, via the latter, to electrically output the rear axle brake pressure. The same applies the other way around. In this way, a further electronic redundancy can therefore be produced.

In a second aspect of the disclosure, the object mentioned at the beginning is achieved by a vehicle, in particular a utility vehicle, having an electronically controllable pneumatic brake system according to one of the above-described embodiments of an electronically controllable pneumatic brake system according to the first aspect of the disclosure. It should be understood that the electronically controllable pneumatic brake system according to the first aspect of the disclosure and the vehicle according to the second aspect of the disclosure have identical and similar subaspects. In this respect, reference is extensively made to the above description.

Embodiments of the disclosure will now be described below with reference to the drawings. These are not necessarily intended to illustrate the embodiments to scale; rather, where expedient for explanatory purposes, the drawings are presented in schematic and/or slightly distorted form. With regard to additions to the teachings that are directly apparent from the drawings, reference is made to the relevant prior art. In this context, it must be taken into consideration that a wide variety of modifications and changes regarding the form and the detail of an embodiment may be made without departing from the general concept of the disclosure.

BRIEF DESCRIPTION OF THE DRAWINGS

The invention will now be described with reference to the drawings wherein.

DESCRIPTION OF THE PREFERRED EMBODIMENTS

Figure 1:
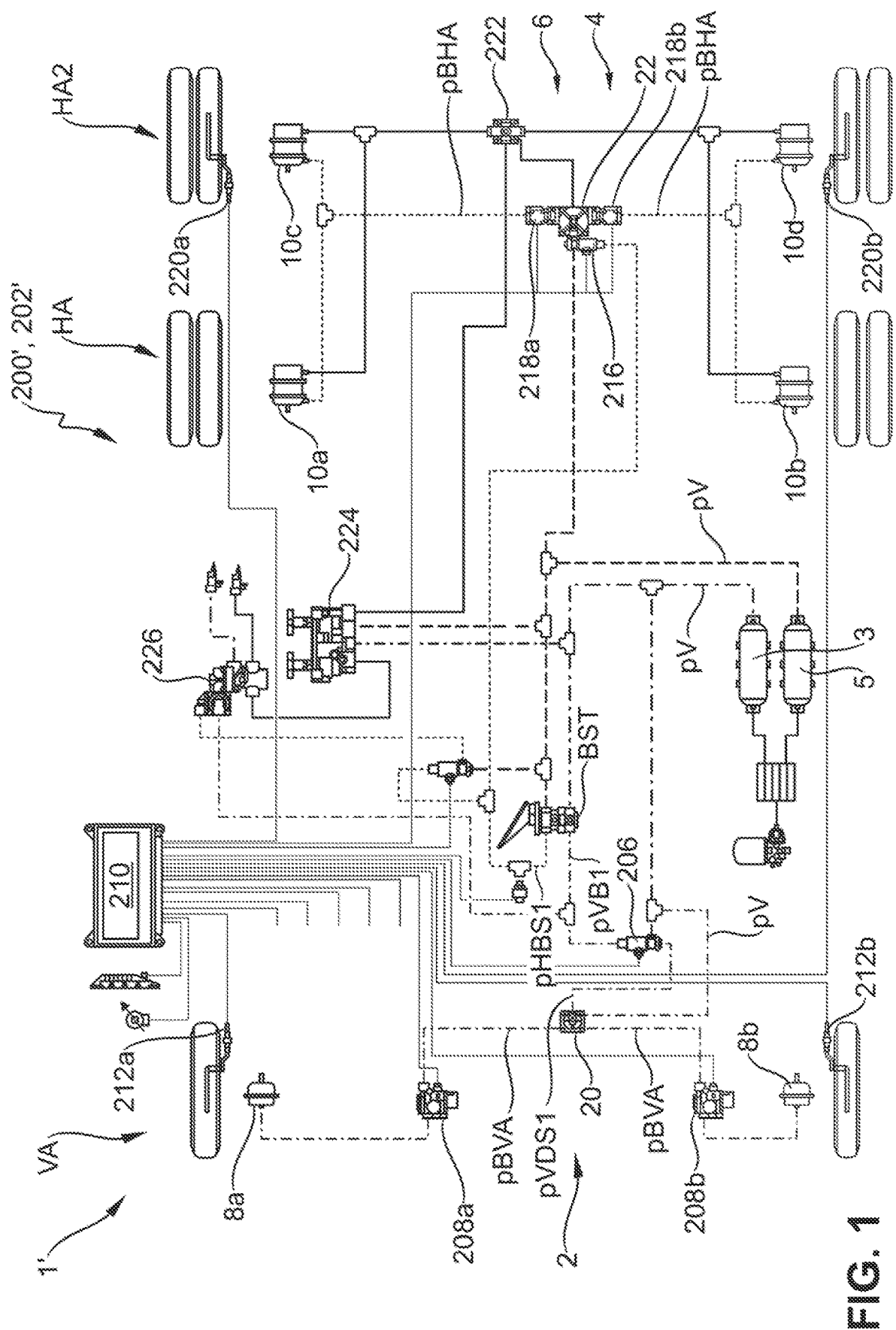
FIG. 1 shows an electrically controllable pneumatic brake system according to the prior art.

FIG. 1 first of all shows a pneumatic brake system 1' according to the prior art. The brake system 1' comprises a front axle brake circuit 2 for a front axle VA and a rear axle brake circuit 4 for a first rear axle HA and a second rear axle HA2. Furthermore, a parking brake circuit 6 is provided for the rear axles HA, HA2. The front axle brake circuit 2 is fed from a first compressed air supply 3, and the rear axle brake circuit 4 from a second compressed air supply 5. Both the first compressed air supply 3 and the second compressed air supply 5 provide a supply pressure pV. The parking brake circuit 6 is also supplied by the second compressed air supply 5. First and second front axle brake actuators 8a, 8b are provided on the front axle VA, and a total of four rear axle brake actuators 10a, 10b, 10c, 10d are provided on the first and second rear axle HA, HA2. The rear axle brake actuators 10a-10d are all configured as what are referred to as Tristop brake cylinders and can act both as service brakes and as immobilizing brakes by having a spring-type brake cylinder.

In the present embodiment, the pneumatic brake system 1' is controlled purely pneumatically. For this purpose, a brake signal transmitter BST is provided which is connected both to the first compressed air supply 3 and to the second compressed air supply 5. The brake signal transmitter BST is configured as what is referred to as a 2 P brake signal transmitter and has two pneumatic outputs, but does not have an electrical output. Upon actuation, the brake signal transmitter BST provides a first front axle brake control pressure pVBS1 at a first output and a first rear axle brake control pressure pHBS1 at a second port. The first front axle brake control pressure pVBS1 is then provided via a front axle 3/2-way valve 206 to a front axle relay valve 20 which then boosts the first front axle brake control pressure in terms of volume and, on the basis thereof, outputs a front axle brake pressure pBVA for the first and second front axle brake actuators 8a, 8b. In order to achieve wheel-appropriate braking here, first and second front axle ABS valves 208a, 208b are provided between the front axle relay valve 20 and the first and second front axle brake actuators 8a, 8b, the front axle ABS valves being connected electrically to a central module 210 in order thus to be switched by the latter. The central module 210 is furthermore connected in a known manner to wheel sensors 212a, 212b on the front axle VA.

The rear axles HA, HA2 are controlled in a similar manner. For this purpose, the first rear axle brake control pressure pHBS1 is provided via a rear axle 3/2-way valve 216 to a rear axle relay valve 22 which boosts the first rear axle brake control pressure pHBS1 in terms of volume and outputs same as rear axle brake pressure pBHA to the first and second rear axles HA, HA2. In turn, as in the case of the front axle, rear axle ABS valves 218a, 218b are provided on the rear axle HA, HA2, and therefore locking of individual wheels on the rear axles HA, HA2 can be prevented. In a known manner, first and second wheel rotational speed sensors 220a, 220b are also provided on the second rear axle HA2 and are connected in turn to the central module 210.

The further elements which can be seen in FIG. 1, such as in particular the parking brake module 222, the push-pull valve 224 and the trailer control valve 226 are not further relevant within the scope of the disclosure described below, and therefore they are not described in detail here. They merely clarify that the disclosure described herein can be provided both for vehicles 200 with and without trailer provision and for vehicles 200 that are provided for the European and also for the US market.

Figure 2:
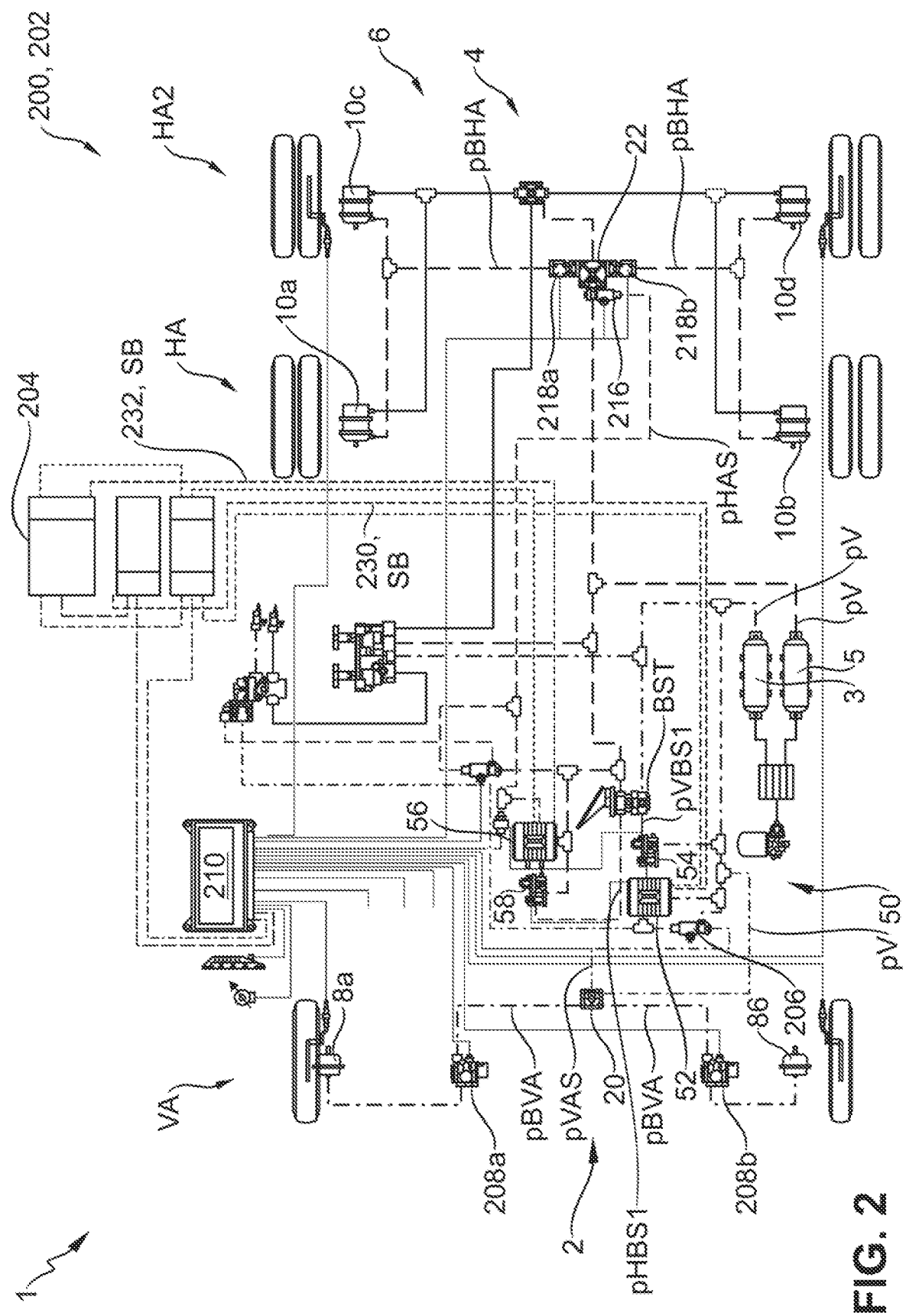
FIG. 2 shows an electrically controllable pneumatic brake system according to an embodiment of the disclosure.

FIG. 2 now shows a first embodiment of an electrically controllable pneumatic brake system 1 which has been constructed on the basis of the pneumatically controllable brake system 1' according to FIG. 1. In principle, it first of all has all of the elements which have also already been provided in the pneumatically controllable brake system 1' according to FIG. 1. In this respect, reference is made to the above description in its entirety. In the following, in particular the differences over the pneumatically controllable brake system 1' according to the prior art will be described.

The electrically controllable pneumatic brake system 1 is provided, according to the disclosure, with a two-channel pressure modulator system 50 which is connected here between the brake signal transmitter BST and both the front and rear axle relay valves 20, 22. The two-channel pressure modulator system is connected via a first bus 230 and a second bus 232 to a unit for autonomous driving 204 and receives an electronic braking demand signal SB therefrom. The two-channel pressure modulator system 50 furthermore receives the supply pressure pV. For this purpose, the two-channel pressure modulator system 50 is connected both to the first compressed air supply 3 and to the second compressed air supply 5. The two-channel pressure modulator system 50 is configured, on the basis of the received electronic braking demand signal SB, to output a front axle braking demand pressure pVAS and a rear axle braking demand pressure pHAS. In the embodiment according to FIG. 2, the front axle braking demand pressure pVAS is supplied to the front axle relay valve 20 which boosts the latter in terms of volume and, on the basis thereof, outputs the front axle brake pressure pBVA. The front axle braking demand pressure pVAS is therefore processed by the front axle relay valve 20 in the manner in which this was the case with the first front axle brake control pressure pVBS1 in the pneumatically controllable brake system 1' according to FIG. 1. Therefore, according to the disclosure, instead of the first front axle brake control pressure pVBS1, the front axle braking demand pressure pVAS, which is output by the two-channel pressure modulator system 50, is provided to the front axle relay valve 20. In a corresponding manner, the two-channel pressure modulator system 50 also outputs the rear axle braking demand pressure pHAS to the rear axle relay valve 22 which boosts it in terms of volume and provides it as rear axle brake pressure pBHA to the rear axles HA, HA2. This takes place as also basically described with regard to FIG. 1 via the front axle 3/2-way valve 206 and the rear axle 3/2-way valve 216, the two valves not being absolutely necessary for the disclosure.

Furthermore, the two-channel pressure modulator system 50 also receives the first front axle brake control pressure pVBS1 and the first rear axle brake control pressure pHBS1 from the brake signal transmitter BST. These two pressures, namely the first front axle brake control pressure pVBS1 and the first rear axle brake control pressure pHBS1, are processed by the two-channel pressure modulator system 50. In particular, it is provided that the two-channel pressure modulator system 50 uses the first front axle brake control pressure pVBS1 and the first rear axle brake control pressure pHBS1, in a redundancy situation if a fault occurs in an electronic component of the two-channel pressure modulator system 50, to redundantly output the front axle braking demand pressure pVAS and/or the rear axle braking demand pressure pHAS.

In addition to the function of using the first front axle brake control pressure pVBS1 and first rear axle brake control pressure pHBS1 output by the brake signal transmitter BST in a redundancy situation, the two-channel pressure modulator system 50 preferably also has the functionality of using these two pressures even if they were to trigger a higher front axle braking demand pressure pVAS or a higher rear axle braking demand pressure pHAS than were the case on the basis of the electronic braking demand signal SB. That is, the two-channel pressure modulator system 50 is preferably capable of permitting the electronic braking demand signal SB to be overridden by manual operator interaction at the brake signal transmitter BST.

In detail, the two-channel pressure modulator system 50 according to the embodiment shown here is formed from four components, namely a first primary modulator 52, a first secondary modulator 54, a second primary modulator 56, and a second secondary modulator 58. The manner of operation and the precise construction of the individual components will now be explained in detail with respect to FIGS. 3 to 5. A combination of primary and secondary modulator is provided in each case for one of the two channels of the two-channel pressure modulator system 50. Thus, the combination of first primary modulator 52 and first secondary modulator 54 is provided for a first channel K1, which here is the front axle channel, and the combination of second primary modulator 56 with second secondary modulator 58 is provided for a second channel K2, which here is the rear axle channel. A compressed air supply 3, 5 is also assigned to each channel K1, K2. The first compressed air supply 3 is assigned to the first channel K1 and the second compressed air supply 5 to the second channel K2. The compressed air supplies 3, 5 are assigned separated entirely in terms of circuitry.

Figure 3:
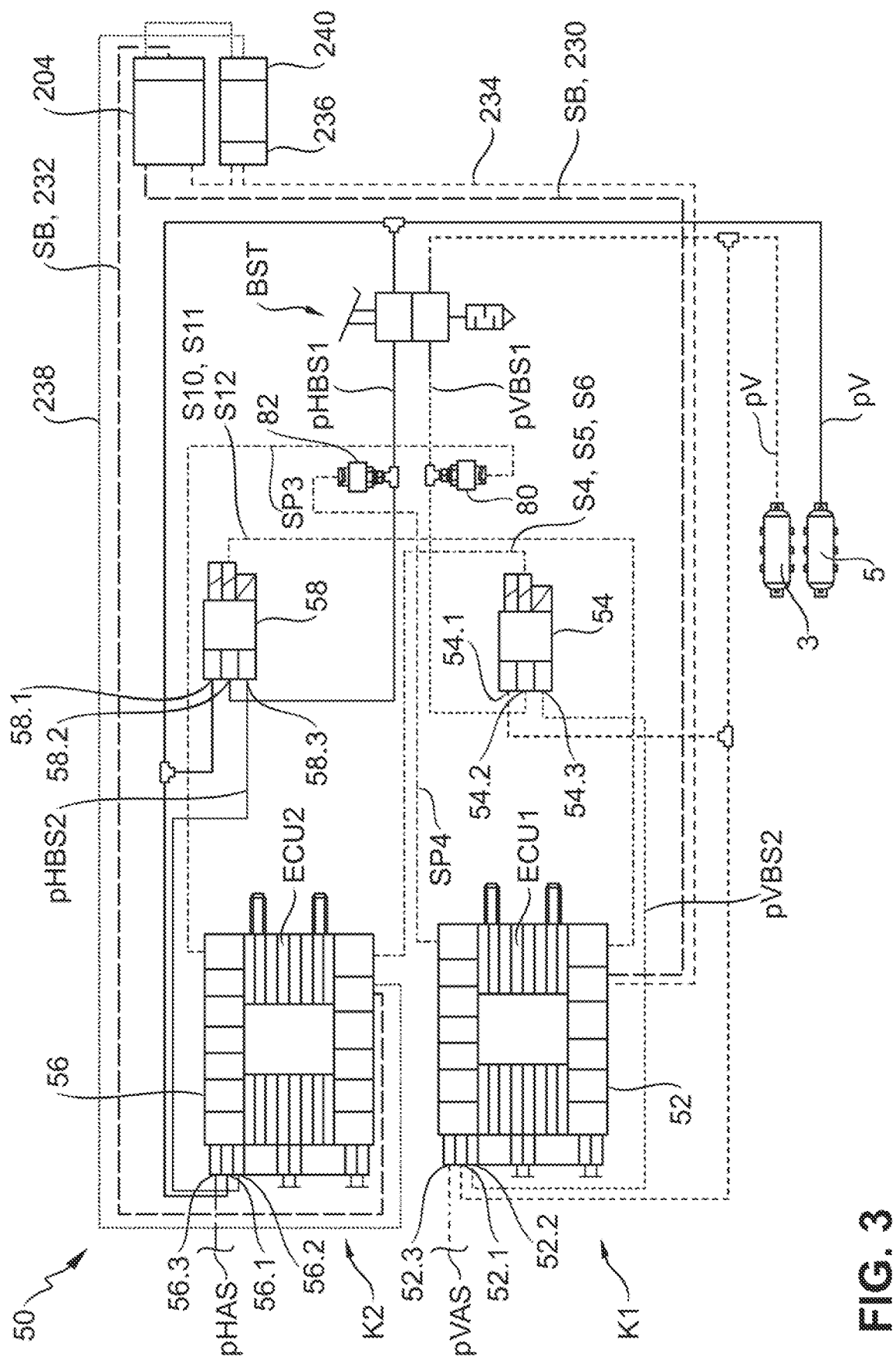
FIG. 3 shows an illustration of a two-channel pressure modulator system.

It can be seen in FIG. 3 that the brake signal transmitter BST is connected both to the first compressed air supply 3 and to the second compressed air supply 5. When the brake signal transmitter BST is actuated, the first front axle brake control pressure pVBS1 and the first rear axle brake control pressure pHBS1 are output. Furthermore, it can be seen in FIG. 3 that the first primary modulator 52 is connected to the first compressed air supply 3 and receives supply pressure pV therefrom. Similarly, the second primary modulator 56 is connected to the second compressed air supply 5 and receives supply pressure pV therefrom. The first and second primary modulators 52, 56 are furthermore connected via the first and second bus 230, 232 to the unit for autonomous driving 204 and receive the electronic braking demand signal SB therefrom. The first primary modulator 52 is connected to a first voltage source 236 via a first voltage line 234 and the second primary modulator 56 is connected to a second voltage source 240 via a second voltage line 238. The first and second voltage sources 236, 240 are separated, and therefore the first and second primary modulators 52, 56 are supplied by separate voltage sources 236, 240.

The first primary modulator 52 has a first electronic control unit ECU1 and the second primary modulator 56 has a second electronic control unit ECU2. The first and second electronic control units ECU1, ECU2 are configured to convert the electronic braking demand signal SB into switching signals, as will be explained more precisely with regard to FIGS. 4 and 5. On the basis of the receipt of the electronic braking demand signal SB, the first primary modulator 52 then outputs a front axle braking demand pressure pVAS and the second primary modulator 56 outputs a rear axle braking demand pressure pHAS. In more precise terms, these two pressures are provided at first and second primary working ports 52.3, 56.3. The first primary working port 52.3 (cf. FIG. 2) is then connected to the front axle 3/2-way valve 206 and, via the latter, in turn to a control port of the front axle relay valve 20. However, the first primary working port 52.3 can also be connected directly to the corresponding control port of the front axle relay valve 20. Similarly, the second primary working port 56.3 is connected via the rear axle 3/2-way valve 216 to the rear axle relay valve 22, in more precise terms to a control port thereof. Similarly, however, the second primary working port 56.3 can also be connected directly to the control port of the rear axle relay valve 22.

According to this embodiment, first and second secondary modulators 54, 58 are arranged between the brake signal transmitter BST and the first and second primary modulators 52, 56. The first secondary modulator 54 is assigned here to the first channel K1 and is arranged pneumatically between the brake signal transmitter BST and the first primary modulator 52, and the second secondary modulator 58 is assigned to the second channel K2 and is arranged pneumatically between the brake signal transmitter BST and the second primary modulator 56. The first secondary modulator 54 receives supply pressure pV at a first secondary supply port 54.1. For this purpose, the first secondary modulator 54 is connected by its first secondary supply port 54.1 to the first compressed air supply 3. Furthermore, the first secondary modulator 54 is connected to the brake signal transmitter BST and receives the first front axle brake control pressure pVBS1 therefrom. For this purpose, the brake signal transmitter BST is connected to a first secondary redundancy port 54.2 of the first secondary modulator 54. The first secondary modulator 54 is configured to boost, in terms of volume, the first front axle brake control pressure pVBS1 output at the first secondary redundancy port 54.2 and to output the pressure, which is boosted in terms of volume, as second front axle brake control pressure pVBS2 at a first secondary working port 54.3 of the first secondary modulator. However, it is also conceivable for no boosting in terms of volume to take place here, but rather for it merely to be forwarded. For this purpose, the first secondary modulator 54 does not need its own intelligence. According to the embodiment shown in FIG. 3, the first secondary modulator 54 is configured without a dedicated electronic control unit.

The second front axle brake control pressure pVBS2 output by the first secondary modulator 54 is then provided to the first primary modulator 52. For this purpose, the first secondary working port 54.3 is connected to a first primary redundancy port 52.2 of the first primary modulator 52. The first primary modulator 52 is configured to boost, in terms of volume, or to forward the second front axle brake control pressure pVBS2 received at the first primary redundancy port 52.2 and to output it as front axle braking demand pressure pVAS. This is the case in particular in a fault situation of the first electronic control unit ECU1 of the first primary modulator 52, if the control unit cannot or cannot correctly process the electronic braking demand signal SB from the unit for autonomous driving 204. In this case, the first primary modulator 52 can use the second front axle brake control pressure pVBS2 output by the first secondary modulator 54 in order to redundantly output the front axle braking demand pressure pVAS. That is, even in a situation in which the first electronic control unit ECU1 cannot or cannot correctly process the electronic braking demand signal SB, the front axle braking demand pressure pVAS can nevertheless be output in order to be able to brake the vehicle 200 in this situation.

The statements which have been made above with regard to the first channel K1 preferably also apply correspondingly to the second channel K2. In the second channel K2, the second secondary modulator 58 is likewise supplied with supply pressure pV and, for this purpose, is connected by a second secondary supply port 58.1 to the second compressed air supply 5. Furthermore, the second secondary modulator 58 is connected to the brake signal transmitter BST and receives the first rear axle brake control pressure pHBS1 therefrom. For this purpose, the second secondary modulator 58 is connected by a second secondary redundancy port 58.2 to the brake signal transmitter BST. The second secondary modulator 58 is configured to boost, in terms of volume, or to forward the first rear axle brake control pressure pHBS1 received at the second secondary redundancy port 58.2 and to provide it as second rear axle brake control pressure pHBS2 at a second secondary working port 58.3. The second primary modulator 56 is configured to receive the second rear axle brake control pressure pHBS2 and, for this purpose, has a second primary redundancy port 56.2 which is connected to the second secondary working port 58.3 and receives the second rear axle brake control pressure pHBS2.

The second primary modulator 56 is configured to boost, in terms of volume, or to forward the second rear axle brake control pressure pHBS2 and to output it as rear axle braking demand pressure pHAS at the second primary working port 56.3. This is the case in particular if the second electronic control unit ECU2 of the second primary modulator 56 has failed and the second primary modulator 56 cannot or cannot correctly process the electronic braking demand signal SB. In such a case, the second primary modulator 56 can redundantly output the rear axle braking demand pressure pHAS on the basis of the second rear axle brake control pressure pHBS2.

Figure 4:
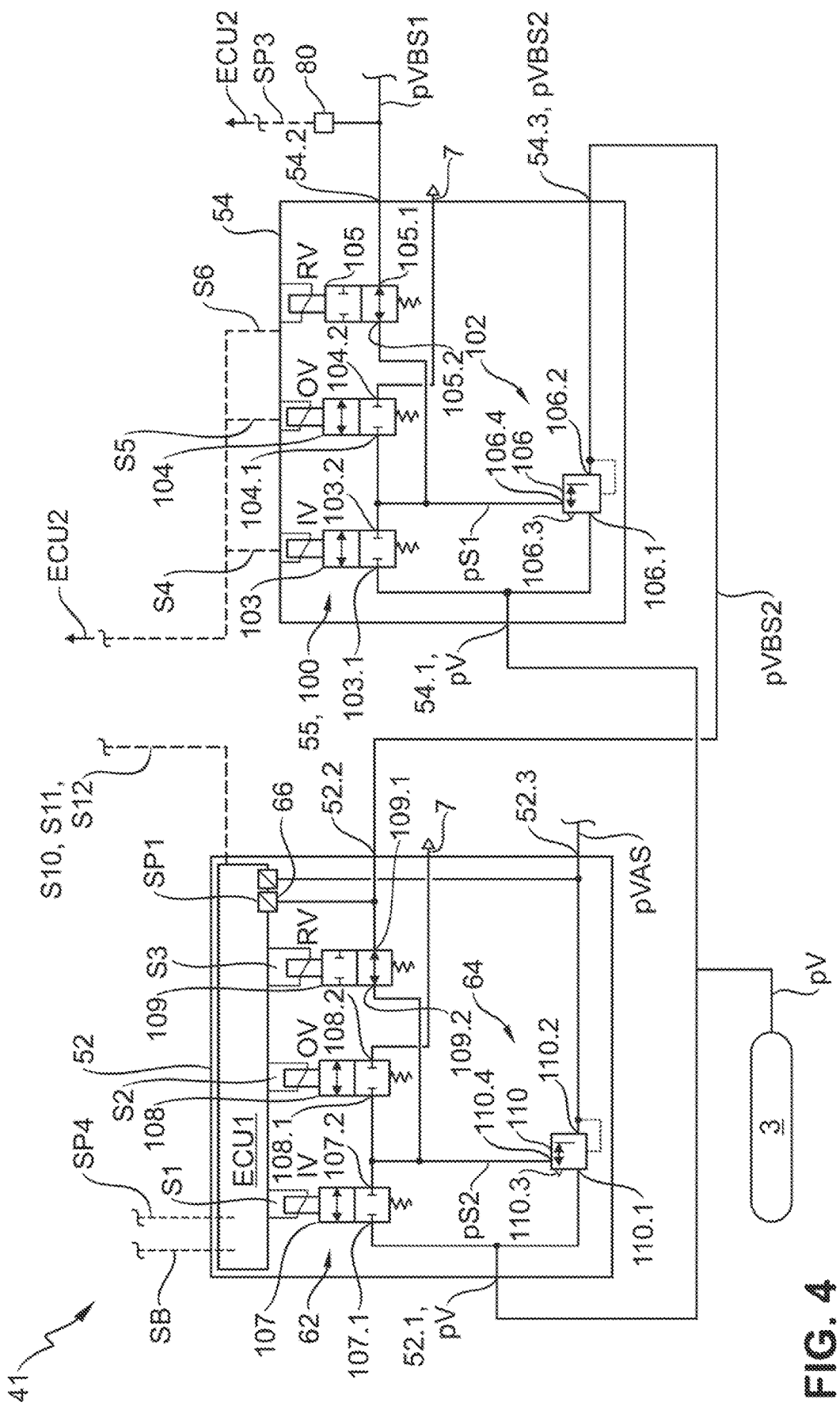
FIG. 4 shows a detailed illustration of part of the two-channel pressure modulator system; and, FIG. 5 shows a second detailed illustration of the two-channel pressure modulator system.
Figure 5:
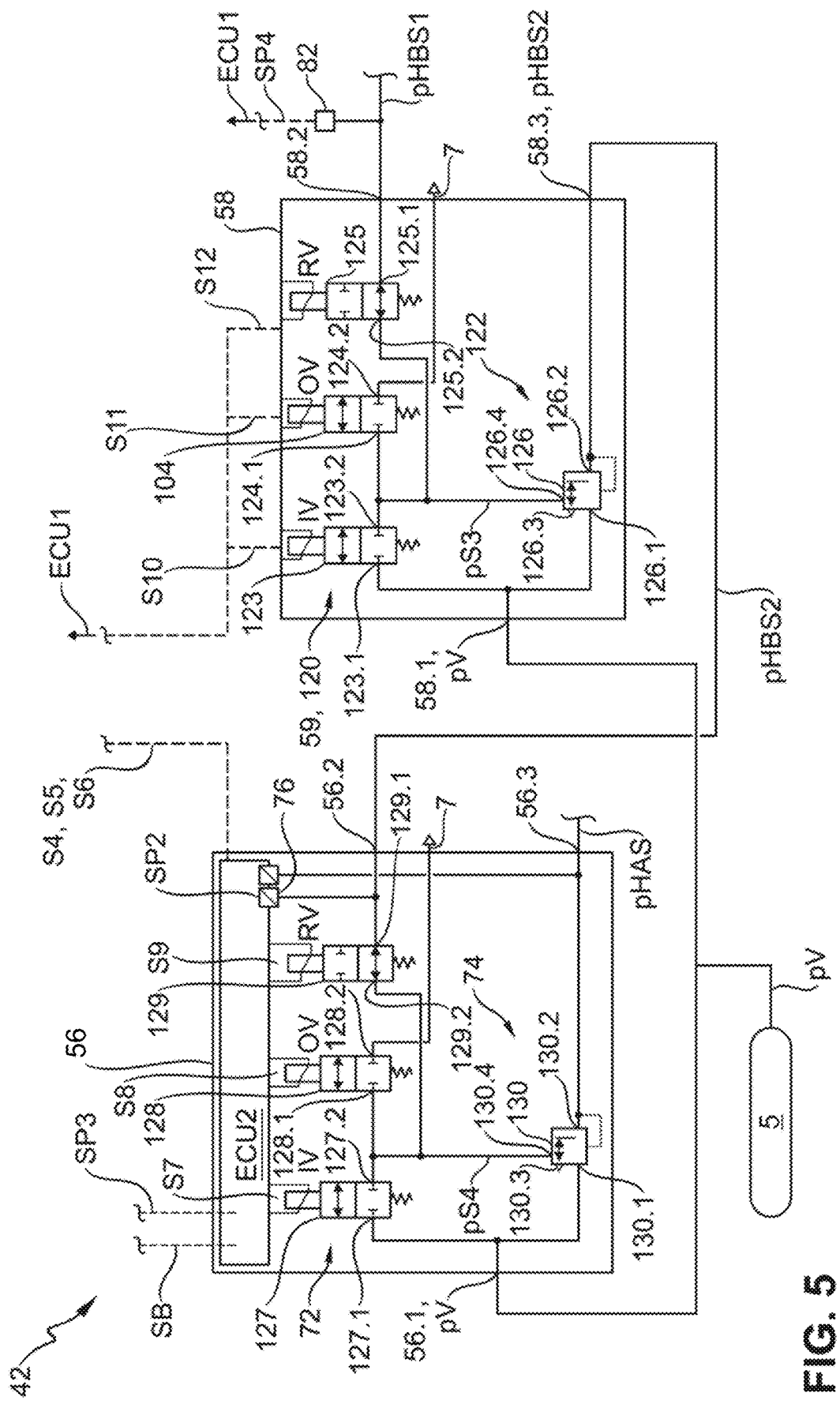

The precise construction of the two-channel pressure modulator system 50, namely in particular of the first and second primary modulator 52, 56 and first and second secondary modulator 54, 58, will now be explained in detail with respect to FIGS. 4 and 5. FIG. 4 shows the first channel K1 with the first primary modulator 52 and with the first secondary modulator 54. FIG. 5 then illustrates the same for the second channel K2 with the second primary modulator 56 and the second secondary modulator 58.

As can be gathered from FIG. 4, the first secondary modulator 54 has a plurality of first electromagnetically switchable secondary valves 55 which here form a first secondary pilot control unit 100. In addition, the first secondary modulator 54 has a first secondary main valve unit 102. The first secondary pilot control unit 100 has a first secondary inlet valve 103, a first secondary outlet valve 104 and a first secondary redundancy valve 105. All three valves 103, 104, 105 are configured here as monostable 2/2-way valves. It should be understood that this is not imperative and, in particular, the first secondary inlet valve 103 and the first secondary outlet valve 104 could also be illustrated integrated together into a 3/2-way valve which then acts in a basically known manner as a combined inlet/outlet valve.

The first secondary redundancy valve 105 is monostable and is open in the de-energized switching position shown in FIG. 4. It has a first secondary redundancy valve port 105.1 which is connected to the first secondary redundancy port 54.2 and therefore receives the first front axle brake control pressure pVBS1 output at the latter. A second secondary redundancy valve port 105.2 is connected to the first secondary main valve unit 102 and outputs the first front axle brake control pressure pVBS1 as first control pressure pS1 if the first secondary redundancy valve 105 is open, as shown in FIG. 4. The first secondary main valve unit 102 is configured here as a first secondary relay valve 106. The first secondary relay valve 106 has a first secondary relay valve supply port 106.1 which is connected to the first secondary supply port 54.1 and receives supply pressure pV. It furthermore has a first secondary relay valve working port 106.2 which is connected to the first secondary working port 54.3 in order to output the second front axle brake control pressure pVBS2 at the latter. In addition, the first secondary relay valve 106 has a first secondary relay valve ventilation port 106.3, which is connected to a vent, and a first secondary relay valve control port 106.4, at which the first control pressure pS1 is output. The first secondary relay valve 106 is configured to boost, in terms of volume, the first control pressure pS1 output at the first secondary relay valve control port 106.4 and to provide it as second front axle brake control pressure pVBS2. If, therefore, the first front axle brake control pressure pVBS1 is provided via the first secondary redundancy port 54.2 to the first secondary modulator 54, the pressure is provided via the open first secondary redundancy valve 105 to the first secondary relay valve 106, boosted in terms of volume and provided as second front axle brake control pressure pVBS2, specifically at the first primary redundancy port 52.2, which is connected to the first secondary working port 54.3.

As already mentioned above, the first primary modulator 52 has a first electronic control unit ECU1 which forms an intelligence for the first primary modulator 52 and receives and processes the electronic braking demand signal SB. In its interior, the first primary modulator 52 has a first primary pilot control unit 62 and a first primary main valve unit 64. Overall, these are formed identically to the first secondary pilot control unit 100 and the first secondary main valve unit 102. In this respect, the first primary pilot control unit 62 has a first primary inlet valve 107, a first primary outlet valve 108 and a first primary redundancy valve 109. The first primary redundancy valve 109 is configured here in turn as a monostable 2/2-way valve which is de-energized in an open switching state, as shown in FIG. 4. The first primary inlet valve 107 and the first primary outlet valve 108 are also shown as monostable 2/2-way valves, which are, however, closed when de-energized. It should be understood in turn that the first primary inlet valve 107 and the first primary outlet valve 108 can also be jointly integrated in a 3/2-way valve. The first primary inlet valve 107 has a first primary inlet valve port 107.1 which is connected to the first primary supply port 52.1 and receives supply pressure pV. A second primary inlet valve port 107.2 is connected to the first primary main valve unit 64, in more precise terms to the first primary relay valve 110. By provision of a first switching signal S1 by the first electronic control unit ECU1, the first primary inlet valve 107 can be switched from the closed switching position, shown in FIG. 4, into the open switching position, not shown in FIG. 4, and therefore the supply pressure pV is put through the first primary inlet valve 107 and provided as second control pressure pS2 to the first primary relay valve 110. The first primary relay valve 110 has a first primary relay valve supply port 110.1 which is connected to the first primary supply port 52.1 and receives supply pressure pV. Furthermore, the first primary relay valve 110 has a first primary relay valve working port 110.2 which is connected to the first primary working port 52.3 for outputting the front axle braking demand pressure pVAS. Furthermore, the first primary relay valve 110 has a first primary relay valve ventilation port 110.3, which is connected to a vent, and a first primary relay valve control port 110.4, which is connected to the first primary pilot control unit 62 and receives the second control pressure pS2. The first primary relay valve 110 is configured to boost the received second control pressure pS2 in terms of volume and to provide it as front axle braking demand pressure pVAS at the first primary working port 52.3, from which the pressure is then output to the front axle relay valve 20 in order to form the front axle brake pressure pBVA. In order to ventilate the second control pressure pS2 or the first primary relay valve control port 110.4, the first primary outlet valve 108 is provided. The first primary outlet valve 108 has a first primary outlet valve port 108.1, which is connected to the first primary relay valve control port 110.4, and a second primary outlet valve port 108.2, which is connected to a vent 7. The first primary outlet valve 108 can be brought by a second switching signal S2, which is provided by the first electronic control unit ECU1, from the closed switching position, shown in FIG. 4, into an open switching position, not shown in FIG. 4, and therefore, on the basis of the second switching signal S2, the first primary relay valve control port 110.4 can be ventilated. In this case, no front axle braking demand pressure pVAS is then output. The first electronic control unit ECU1 therefore converts the electronic braking demand signal SB into the first and second switching signals S1, S2 in order thus to output the front axle braking demand pressure pVAS in accordance with the electronic braking demand signal SB.

As can be seen in FIG. 4, the first primary modulator 52 also comprises a first primary pressure sensor 66 which is arranged here between the first primary redundancy port 52.2 and the first primary redundancy valve 109 and therefore detects the second front axle brake control pressure pVBS2 output at the first primary redundancy port 52.2. The first primary pressure sensor 66 then provides a first pressure signal SP1 to the first electronic control unit ECU1, the pressure signal representing the second front axle brake control pressure pVBS2. The first electronic control unit ECU1 is configured to process the first pressure signal SP1. It is provided here that the first electronic control unit ECU1 closes the first primary redundancy valve 109 via the third switching signal S3 and therefore locks out the second front axle brake control pressure pVBS2 if the first pressure signal SP1 indicates that the front axle braking demand pressure pVAS, which is output in response to the second front axle brake control pressure pVBS2, would be smaller than the front axle braking demand pressure pVAS which would be output on the basis of the electronic braking demand signal SB. That is, the first electronic control unit ECU1 decides whether the front axle braking demand pressure pVAS is output on the basis of the electronic braking demand signal SB or on the basis of the second front axle brake control pressure pVBS2, depending on whether a higher front axle braking demand pressure pVAS would be caused by them. This functionality can also be referred to as "hot redundancy" since, with the brake signal transmitter BST via the first front axle brake control pressure pVBS1 and the second front axle brake control pressure pVBS2, the vehicle driver can, purely pneumatically, override the front axle braking demand pressure pVAS, which is output on the basis of the electronic braking demand signal SB, in order to initiate more powerful braking. However, as long as the vehicle driver, via the brake signal transmitter BST, demands only a smaller front axle braking demand pressure pVAS, the first electronic control unit ECU1 closes the first primary redundancy valve 109 and thus locks out the second front axle brake control pressure pVBS2 such that the front axle braking demand pressure pVAS is output exclusively on the basis of the electronic braking demand signal SB. In order to implement this functionality, the first secondary redundancy valve 105 and/or the first primary redundancy valve 109 are/is open preferably during normal operation of the vehicle 200.

As already mentioned, the first channel K1 and the second channel K2 are constructed substantially identically. In this respect, the second secondary modulator 58 comprises second electromagnetically switchable secondary valves 59 which form a second secondary pilot control unit 120. In addition to the second secondary pilot control unit, the second secondary modulator 58 also has a second secondary main valve unit 122. The second secondary pilot control unit 120 has a second secondary inlet valve 123, a second secondary outlet valve 124 and a second secondary redundancy valve 125. All three valves 123, 124, 125 are configured in turn as monostable 2/2-way switching valves. In turn, however, it is also preferred to reproduce the second secondary inlet valve 123 and the second secondary outlet valve 124 jointly in a 3/2-way valve. The second secondary redundancy valve 125 has a third secondary redundancy valve port 125.1 and a fourth secondary redundancy valve port 125.2. The third secondary redundancy valve port 125.1 is connected to the second secondary redundancy port 58.2 and receives the first rear axle brake control pressure pHBS1 therefrom. The second secondary redundancy valve 125 is open when de-energized and connected via the fourth secondary redundancy valve port 125.2 to the second secondary main valve unit 122 in order to output the first rear axle brake control pressure pHBS1 there as third control pressure pS3. The second secondary main valve unit 122 has a second secondary relay valve 126. The second secondary relay valve 126 has a second secondary relay valve supply port 126.1 which is connected to the second secondary supply port 58.1 and receives supply pressure pV therefrom. Furthermore, the second secondary relay valve 126 has a second secondary relay valve working port 126.2 which is connected to the second secondary working port 58.3 and outputs the second rear axle brake control pressure pHBS2 at the latter. The pressure is then output at the second primary redundancy port 56.2 and thus provided to the second primary modulator 56.

As has basically already been described with respect to the first primary modulator 52, the second primary modulator 56 also has a second primary pilot control unit 72 and a second primary main valve unit 74. The second primary pilot control unit 72 has a second primary inlet valve 127, a second primary outlet valve 128 and a second primary redundancy valve 129.

The second primary inlet valve 127 has a third primary inlet valve port 127.1 which is connected to the second primary supply port 56.1 and receives supply pressure pV. A fourth primary inlet valve port 127.2 is connected to the second primary main valve unit 74 and outputs a fourth control pressure pS4 at the latter. In more precise terms, the second primary main valve unit 74 comprises a second primary relay valve 130, with a second primary relay valve supply port 130.1, which is connected to the second primary supply port 56.1 and receives supply pressure pV therefrom, a second primary relay valve working port 130.2, which is connected to the second primary working port 56.3 in order to provide the rear axle braking demand pressure pHAS at the latter, a second primary relay valve ventilation port 130.3, which is connected to a vent, and a second primary relay valve control port 130.4, which is connected to the second primary pilot control unit 72 and receives the fourth control pressure pS4. The second primary relay valve 130 is configured to receive the fourth control pressure pS4, to boost it in terms of volume and, on the basis of receiving the fourth control pressure pS4, to output the rear axle braking demand pressure pHAS. To ventilate the second primary relay valve control port 130.4, the second primary outlet valve 128 is provided which is connected via a third primary outlet valve port 128.1 to the second primary relay valve control port 130.4. A fourth primary outlet valve port 128.2 is connected to a vent 7. The second primary inlet valve 127 and the second primary outlet valve 128 are brought by the second electronic control unit ECU2, via a seventh and an eighth switching signal S7, S8, from the respectively closed first switching position, shown in FIG. 5, into the second, open switching position, not shown in FIG. 5. Via the seventh switching signal S7, the fourth control pressure pS4 can be output, and therefore, in response thereto, the rear axle braking demand pressure pHAS is output. Via the eighth switching signal S8, the second primary outlet valve 128 can in turn be switched, and therefore the fourth control pressure pS4 is ventilated and, as a consequence, no rear axle braking demand pressure pHAS is output. The second electronic control unit ECU2 is configured to receive the electronic braking demand signal SB and, in response thereto, to correspondingly provide the seventh and eighth switching signals S7, S8 such that a rear axle braking demand pressure pHAS corresponding to the electronic braking demand signal SB is output.

As also described with respect to the first primary modulator 52, the second primary modulator 56 also has a redundancy valve, namely the second primary redundancy valve 129. The second primary redundancy valve 129 has a third primary redundancy valve port 129.1 which is connected to the second primary redundancy port 56.2 and receives the second rear axle brake control pressure pHBS2 via the latter. Pneumatically connected downstream of the second primary redundancy port 56.2 is a second primary pressure sensor 76 which provides a second pressure signal SP2 to the second electronic control unit ECU2. The second electronic control unit ECU2 is configured in accordance with the first electronic control unit ECU1 to compare the second pressure signal SP2 with the braking demand signal SB and correspondingly to decide on the basis of which of the signals a higher rear axle braking demand pressure pHAS is output. For the precise functionality, reference is made to the above description since it applies here in a corresponding manner.

In addition to the purely pneumatic redundancy which has just been described and in which initially the first front axle brake control pressure pVBS1 and the first rear axle brake control pressure pHBS1 are output solely via the brake signal transmitter BST, the pressures are then provided to the first and second secondary modulators 54, 58 which in each case boost the pressure in terms of volume and/or put the pressure through, then provide the pressure which has been boosted in terms of volume or has been put through as second front axle brake control pressure pVBS2 and second rear axle brake control pressure pHBS2 to the first and second primary modulators 52, 56 which then process the pressure as redundancy pressure and, on the basis of the latter, then output the front axle braking demand pressure pVAS and rear axle braking demand pressure pHAS purely pneumatically. No electronics are required for this purpose. The redundancy valves, namely the first secondary redundancy valve 105, the first primary redundancy valve 109, the second secondary redundancy valve 125 and the second primary redundancy valve 129 are open when de-energized.

The electronic redundancy now uses a first braking request pressure sensor 80 and a second braking request pressure sensor 82 (cf. FIG. 3). The first braking request pressure sensor 80 is provided to detect the first front axle brake control pressure pVBS1 and the second braking request pressure sensor 82 is provided to detect the first rear axle brake control pressure pHBS1. For this purpose, the two braking request pressure sensors 80, 82 are arranged downstream of the brake signal transmitter BST. The first braking request pressure sensor 80 is then connected to the second electronic control unit ECU2 of the second primary modulator 56 and provides a third pressure signal SP3 thereto. In a corresponding manner, the second braking request pressure sensor 82 is connected to the first electronic control unit ECU1 of the first primary modulator 52 and provides a fourth pressure signal SP4 thereto. In this way, the second primary modulator 56, which is provided for the second channel K2, obtains information regarding a manually output first front axle brake control pressure pVBS1, which is provided for the first channel K1. Similarly, the first primary modulator 52 obtains information regarding the manually output first rear axle brake control pressure pHBS1, which is provided for the second channel K2.

Furthermore, the first electronic control unit ECU1 is connected to the second secondary modulator 58 and the second electronic control unit ECU2 is connected to the first secondary modulator 54. A crosswise arrangement is therefore provided here. The first electronic control unit ECU1 is provided and configured to provide switching signals S10, S11, S12 to the second secondary modulator 58, in more precise terms to the second electromagnetically switchable secondary valves 59. The second electronic control unit ECU2 is furthermore configured and provided to provide switching signals S4, S5, S6 to the first secondary modulator 54, in more precise terms to the first electromagnetically switchable secondary valves 55, in order to switch the latter. In this way, it is not necessary, in a redundancy situation, if, for example, the first electronic control unit ECU1 or the second electronic control unit ECU2 fails, for the first front axle brake control pressure pVBS1 or the first rear axle brake control pressure pHBS1 to be realized purely pneumatically in the first and second secondary modulators 54, 58. On the contrary, it is possible for the corresponding third and fourth pressure signals SP3, SP4 to be used and for the first and the second primary modulator 52, 56 to then correspondingly activate the respectively assigned second and first secondary modulators 54, 58 in order in this way to electronically output the second front axle brake control pressure pVBS2 and second rear axle brake control pressure pHBS2. The pressure can then be implemented again purely pneumatically as redundancy pressure in the primary modulator 52, 56 which has failed in each case. This makes it possible for the primary modulator 52, 56 which is in each case still functioning not only to use the pure level of the pressure output by the brake signal transmitter BST, but in particular also further information, such as brake pressure distribution, loading or the like, the information being provided by the unit for autonomous driving 204 via the first or second bus 230, 232.

In detail, this can be seen in turn in FIGS. 4 and 5. It can be seen with respect to the first secondary modulator 54 that the first secondary inlet valve 103 can be brought by a fourth switching signal S4 of the second electronic control unit ECU2 from the first closed switching position, shown in FIG. 4, into a second open switching position, not shown in FIG. 4. Similarly, the first secondary outlet valve 104 can be brought by a fifth switching signal S5 of the second electronic control unit ECU2 from a first closed switching position, shown in FIG. 4, into a second open switching position, not shown in FIG. 4. The first secondary inlet valve 103 has a first secondary inlet valve port 103.1 which is connected to the first secondary supply port 54.1 and receives supply pressure pV therefrom. By switching the first secondary inlet valve 103 into the second switching position, not shown in FIG. 4, the supply pressure pV is put through at a second secondary inlet valve port 103.2 and is thus provided as the first control pressure pS1 to the first secondary main valve unit 102, in more precise terms to the first secondary relay valve control port 106.4. The first secondary relay valve 106 thereupon then outputs the second front axle brake control pressure pVBS2. This outputting is referred to as electronic outputting since it takes place on the basis of an electrically switched valve, namely the first secondary inlet valve 103. Provision can be made during this operation for the first secondary redundancy valve 105 to be brought into the second closed switching position, not shown in FIG. 4, by provision of a sixth switching signal S6 by the second electronic control unit ECU2, in order thus to lock out the first front axle brake control pressure pVBS1 in order to avoid overriding. To ventilate the first secondary main valve unit 102, the first secondary outlet valve 104 is provided which is connected to the first secondary main valve unit 102 with a first secondary outlet valve port 104.1. The second secondary outlet valve port 104.2 is connected to a vent 7. By provision of the fifth switching signal S5 by the second electronic control unit ECU2, the first secondary main valve unit 102 can therefore be ventilated.

The same also applies to the second channel K2 and therefore to the second secondary modulator 58. As can be seen from FIG. 5, the second secondary inlet valve 123 can be switched by a tenth switching signal S10 which is provided by the first electronic control unit ECU1, namely from a first closed switching position, shown in FIG. 5, into a second open switching position, not shown in FIG. 5. The second secondary outlet valve 124 can be switched by an eleventh switching signal S11 from the first electronic control unit ECU1 from a first closed switching position, shown in FIG. 5, into a second open switching position, not shown in FIG. 5, and the second secondary redundancy valve 125 can be brought by a twelfth switching signal S12 from the first electronic control unit ECU1 from a first open switching position, shown in FIG. 5, into a second closed switching position, not shown in FIG. 5. In turn, the second secondary inlet valve 123, which is connected by a third secondary inlet valve port 123.1 to the second secondary supply port 58.1 and receives supply pressure pV and is connected by a fourth secondary inlet valve port 123.2 to the second secondary main valve unit 122, in more precise terms to the second secondary relay valve control port 126.4, can be switched in order to provide the third control pressure pS3. To ventilate the third control pressure pS3, it is then possible to switch the second secondary outlet valve 124 which, for its part, is connected by a third secondary outlet valve port 124.1 to the second secondary main valve unit 122 and is connected by a fourth secondary outlet valve port 124.2 to a vent 7. In this way, it is again possible, as described with respect to the first channel K1, to electronically output the second rear axle brake control pressure pHBS2. Provision can be made during this control for the second secondary redundancy valve 125 to be closed by provision of the twelfth switching signal S12, in order to lock out the first rear axle brake control pressure pHBS1.

It is understood that the foregoing description is that of the preferred embodiments of the invention and that various changes and modifications may be made thereto without departing from the spirit and scope of the invention as defined in the appended claims.

LIST OF REFERENCE SIGNS (PART OF THE DESCRIPTION)

1 Electrically controllable pneumatic brake system
1' Pneumatic brake system (prior art)
2 Front axle brake circuit
3 First compressed air supply
4 Rear axle brake circuit
5 Second compressed air supply
6 Parking brake circuit
7 Vent
8a, 8b Front axle brake actuators
10a, 10b, 10c, 10d Rear axle brake actuators
20 Front axle relay valve
22 Rear axle relay valve
50 Two-channel pressure modulator system
52 First primary modulator
52.1 First primary supply port
52.2 First primary redundancy port
52.3 First primary working port
54 First secondary modulator
54.1 First secondary supply port
54.2 First secondary redundancy port
54.3 First secondary working port
55 First electromagnetically switchable secondary valves
56 Second primary modulator
56.1 Second primary supply port
56.2 Second primary redundancy port
56.3 Second primary working port
58 Second secondary modulator
58.1 Second secondary supply port
58.2 Second secondary redundancy port
58.3 Second secondary working port
59 Second electromagnetically switchable secondary valves
62 First primary pilot control unit
64 First primary main valve unit
66 First primary pressure sensor
72 Second primary pilot control unit
74 Second primary main valve unit
76 Second primary pressure sensor
80 First braking request pressure sensor
82 Second braking request pressure sensor
100 First secondary pilot control unit
102 First secondary main valve unit
103 First secondary inlet valve
103.1 First secondary inlet valve port
103.2 Second secondary inlet valve port
104 First secondary outlet valve
104.1 First secondary outlet valve port
104.2 Second secondary outlet valve port
105 First secondary redundancy valve
105.1 First secondary redundancy valve port
105.2 Second secondary redundancy valve port
106 First secondary relay valve
106.1 First secondary relay valve supply port
106.2 First secondary relay valve working port
106.3 First secondary relay valve ventilation port
106.4 First secondary relay valve control port
107 First primary inlet valve
107.1 First primary inlet valve port
107.2 Second primary inlet valve port
108 First primary outlet valve
108.1 First primary outlet valve port
108.2 Second primary outlet valve port
109 First primary redundancy valve
109.1 first primary redundancy valve port
109.2 Second primary redundancy valve port
110 First primary relay valve
110.1 First primary relay valve supply port
110.2 First primary relay valve working port
110.3 First primary relay valve ventilation port
110.4 First primary relay valve control port
120 Second secondary pilot control unit
122 Second secondary main valve unit
123 Second secondary inlet valve
123.1 Third secondary inlet valve port
123.2 Fourth secondary inlet valve port
124 Second secondary outlet valve
124.1 Third secondary outlet valve port
124.2 Fourth secondary outlet valve port
125 Second secondary redundancy valve
125.1 Third secondary redundancy valve port
125.2 Fourth secondary redundancy valve port
126 Second secondary relay valve
126.1 Second secondary relay valve supply port 126.2 Second secondary relay valve working port
126.3 Second secondary relay valve ventilation port
126.4 Second secondary relay valve control port
127 Second primary inlet valve
127.1 Third primary inlet valve port
127.2 Fourth primary inlet valve port
128 Second primary outlet valve
128.1 Third primary outlet valve port
128.2 Fourth primary outlet valve port
129 Second primary redundancy valve
129.1 Third primary redundancy valve port
129.2 Fourth primary redundancy valve port
130 Second primary relay valve
130.1 Second primary relay valve supply port
130.2 Second primary relay valve working port
130.3 Second primary relay valve ventilation port
130.4 Second primary relay valve control port
200 Vehicle
202 Utility vehicle
204 Unit for autonomous driving
206 Front axle 3/2-way valve
208a, 208b Front axle ABS valves
210 Central module
212a, 212b Wheel sensors front axle
216 Rear axle 3/2-way valve
218a, 218b Rear axle ABS valves
220a, 220b Wheel sensors rear axle
222 Parking brake module
224 Push-pull valve
226 Trailer control valve
230 First BUS
232 Second BUS
234 First voltage line
236 First voltage source
238 Second voltage line
240 Second voltage source
ECU1 First electronic control unit
ECU2 Second electronic control unit
pV Supply pressure
pVBS1 First front axle brake control pressure
pHBS1 First rear axle brake control pressure
pVBS2 Second front axle brake control pressure
pHBS2 Second rear axle brake control pressure
pBVA Front axle brake pressure
pBHA Rear axle brake pressure
pVAS Front axle braking demand pressure
pHAS Rear axle braking demand pressure
pS1-pS4 First to fourth control pressure
SB Electronic braking demand signal
S1-S12 First to twelfth switching signal
SP1-SP4 First to fourth pressure signal
VA Front axle
HA Rear axle
HA2 Second rear axle

What is claimed is:

1. An electrically controllable pneumatic brake system for a vehicle, the electrically controllable pneumatic brake system comprising:
a front axle brake circuit for a front axle of the vehicle, said front axle brake circuit having a first compressed air supply and a plurality of front axle brake actuators;
a rear axle brake circuit for at least one rear axle of the vehicle, said rear axle brake circuit having a second compressed air supply and a plurality of rear axle brake actuators;
a brake signal transmitter configured to be actuated manually;
said brake signal transmitter being connected to said first compressed air supply and to said second compressed air supply and being configured to, upon actuation, output a first front axle brake control pressure and a first rear axle brake control pressure;
said front axle brake circuit having a front axle relay valve which is connected to said first compressed air supply and is configured, upon receipt of a front axle braking demand pressure, to output a front axle brake pressure to the front axle brake actuators;
said rear axle brake circuit having a rear axle relay valve which is connected to said second compressed air supply and is configured, upon receipt of a rear axle braking demand pressure, to output a rear axle brake pressure to said plurality of rear axle brake actuators;
a two-channel pressure modulator system which is connected between said brake signal transmitter and said front and rear axle relay valves;
said two-channel pressure modulator system being configured to receive an electronic braking demand signal from a unit for autonomous driving and, in response thereto, to output the front axle braking demand pressure and the rear axle braking demand pressure;
said two-channel pressure modulator system being further configured to receive the first front axle brake control pressure and the first rear axle brake control pressure and, at least in a fault situation of an electronic component of said pressure modulator system, to output at least one of the front axle braking demand pressure in dependence upon the first front axle brake control pressure and the rear axle braking demand pressure in dependence upon the first rear axle brake control pressure; and,
wherein said two-channel pressure modulator system is configured to output at least one of the front axle braking demand pressure in dependence upon the first front axle brake control pressure and the rear axle braking demand pressure in dependence upon the first rear axle brake control pressure whenever at least one of the first front axle brake control pressure and of the first rear axle brake control pressure initiates a higher front axle braking demand pressure and/or rear axle braking demand pressure than the front axle braking demand pressure and/or rear axle braking demand pressure demanded by the electronic braking demand signal.

2. An electrically controllable pneumatic brake system for a vehicle, the electrically controllable pneumatic brake system comprising:
a front axle brake circuit for a front axle of the vehicle, said front axle brake circuit having a first compressed air supply and a plurality of front axle brake actuators;
a rear axle brake circuit for at least one rear axle of the vehicle, said rear axle brake circuit having a second compressed air supply and a plurality of rear axle brake actuators;
a brake signal transmitter configured to be actuated manually;
said brake signal transmitter being connected to said first compressed air supply and to said second compressed air supply and being configured to, upon actuation, output a first front axle brake control pressure and a first rear axle brake control pressure;
said front axle brake circuit having a front axle relay valve which is connected to said first compressed air supply and is configured, upon receipt of a front axle braking demand pressure, to output a front axle brake pressure to the front axle brake actuators;

said rear axle brake circuit having a rear axle relay valve which is connected to said second compressed air supply and is configured, upon receipt of a rear axle braking demand pressure, to output a rear axle brake pressure to said plurality of rear axle brake actuators;

a two-channel pressure modulator system which is connected between said brake signal transmitter and said front and rear axle relay valves;

said two-channel pressure modulator system being configured to receive an electronic braking demand signal from a unit for autonomous driving and, in response thereto, to output the front axle braking demand pressure and the rear axle braking demand pressure;

said two-channel pressure modulator system being further configured to receive the first front axle brake control pressure and the first rear axle brake control pressure and, at least in a fault situation of an electronic component of said pressure modulator system, to output at least one of the front axle braking demand pressure in dependence upon the first front axle brake control pressure and the rear axle braking demand pressure in dependence upon the first rear axle brake control pressure;

said two-channel pressure modulator system having, for a first channel, a first primary modulator and a first secondary modulator which are pneumatically connected in series; and, said two-channel pressure modulator system having, for a second channel, a second primary modulator and a second secondary modulator which are pneumatically connected in series.

3. The electrically controllable pneumatic brake system of claim 2, wherein said first secondary modulator is connected between said first primary modulator and said brake signal transmitter; and, said second secondary modulator is connected between said second primary modulator and said brake signal transmitter.

4. The electrically controllable pneumatic brake system of claim 2, wherein said first primary modulator has a first electronic control unit and said second primary modulator has a second electronic control unit which are each configured to receive the electronic braking demand signal; and, said first primary modulator being configured, in response to receiving the electronic braking demand signal, to output the front axle braking demand pressure, and said second primary modulator being configured, in response to receiving the electronic braking demand signal, to output the rear axle braking demand pressure.

5. The electrically controllable pneumatic brake system of claim 4, wherein:

said first secondary modulator has at least one first electromagnetically switchable secondary valve which is electrically connected to said second electronic control unit in order to receive switching signals therefrom; and, said second secondary modulator has at least one second electromagnetically switchable secondary valve which is electrically connected to said first electronic control unit in order to receive switching signals therefrom.

6. The electrically controllable pneumatic brake system of claim 2, wherein:

said first secondary modulator has a first secondary supply port for receiving supply pressure, a first secondary redundancy port for receiving the first front axle brake control pressure from said brake signal transmitter, and a first secondary working port configured to output a second front axle brake control pressure to said first primary modulator; and, said second secondary modulator has a second secondary supply port for receiving supply pressure, a second secondary redundancy port for receiving the first rear axle brake control pressure from said brake signal transmitter, and a second secondary working port configured to output a second rear axle brake control pressure to said second primary modulator.

7. The electrically controllable pneumatic brake system of claim 6, wherein said first secondary redundancy port and said second secondary redundancy port are open with respect to said brake signal transmitter during normal operation.

8. The electrically controllable pneumatic brake system of claim 2, wherein:

said first primary modulator has a first primary supply port for receiving supply pressure, a first primary redundancy port for receiving a second front axle brake control pressure or the first front axle brake control pressure, and a first primary working port for outputting the front axle braking demand pressure to said front axle relay valve; and, said second primary modulator has a second primary supply port for receiving supply pressure, a second primary redundancy port for receiving a second rear axle brake control pressure, and a second primary working port for outputting the rear axle brake demand pressure to said rear axle relay valve.

9. The electrically controllable pneumatic brake system of claim 8, wherein:

said first primary modulator is configured to lock out the second front axle brake control pressure if, in response thereto, a lower front axle braking demand pressure is output than the front axle braking demand pressure demanded by the electronic braking demand signal; and, said second primary modulator is configured to lock out the second rear axle brake control pressure if, in response thereto, a lower rear axle braking demand pressure is output than the rear axle braking demand pressure demanded by the electronic braking demand signal.

10. The electrically controllable pneumatic brake system of claim 9, wherein:

said first primary modulator has a first primary pressure sensor connected downstream of said first primary redundancy port in order to detect a pressure present at said first primary redundancy port and to provide a corresponding first pressure signal to a first electronic control unit; and, said second primary modulator has a second primary pressure sensor connected downstream of said second primary redundancy port in order to detect a pressure present at said second primary redundancy port and to provide a corresponding second pressure signal to a second electronic control unit.

11. The electrically controllable pneumatic brake system of claim 1 further comprising a first braking request pressure sensor configured to detect the first front axle brake control pressure and a second braking request pressure sensor for detecting the first rear axle brake control pressure.

12. The electrically controllable pneumatic brake system of claim 4 further comprising:

a first braking request pressure sensor configured to detect the first front axle brake control pressure;

a second braking request pressure sensor for detecting the first rear axle brake control pressure;
said first braking request pressure sensor being configured to provide a third pressure signal to said second electronic control unit; and,
said second braking request pressure sensor being configured to provide a fourth pressure signal to said first electronic control unit.

13. The electrically controllable pneumatic brake system of claim 1, wherein the vehicle is a utility vehicle.

14. A vehicle comprising:
an electrically controllable pneumatic brake system having a front axle brake circuit for a front axle of the vehicle, said front axle brake circuit having a first compressed air supply and a plurality of front axle brake actuators;
said electrically controllable pneumatic brake system further having a rear axle brake circuit for at least one rear axle of the vehicle, said rear axle brake circuit having a second compressed air supply and a plurality of rear axle brake actuators;
said electrically controllable pneumatic brake system including a brake signal transmitter and a two-channel pressure modulator system;
said brake signal transmitter being configured to be actuated manually;
said brake signal transmitter being connected to said first compressed air supply and to said second compressed air supply and being configured to, upon actuation, output a first front axle brake control pressure and a first rear axle brake control pressure;
said front axle brake circuit having a front axle relay valve which is connected to said first compressed air supply and is configured, upon receipt of a front axle braking demand pressure, to output a front axle brake pressure to the front axle brake actuators;
said rear axle brake circuit having a rear axle relay valve which is connected to said second compressed air supply and is configured, upon receipt of a rear axle braking demand pressure, to output a rear axle brake pressure to said plurality of rear axle brake actuators;
said two-channel pressure modulator system being connected between said brake signal transmitter and said front and rear axle relay valves;
said two-channel pressure modulator system being configured to receive an electronic braking demand signal from a unit for autonomous driving and, in response thereto, to output the front axle braking demand pressure and the rear axle braking demand pressure;
said two-channel pressure modulator system being further configured to receive the first front axle brake control pressure and the first rear axle brake control pressure and, at least in a fault situation of an electronic component of said pressure modulator system, to output at least one of the front axle braking demand pressure in dependence upon the first front axle brake control pressure and the rear axle braking demand pressure in dependence upon the first rear axle brake control pressure; and,
wherein said two-channel pressure modulator system is configured to output at least one of the front axle braking demand pressure in dependence upon the first front axle brake control pressure and the rear axle braking demand pressure in dependence upon the first rear axle brake control pressure whenever at least one of the first front axle brake control pressure and of the first rear axle brake control pressure initiates a higher front axle braking demand pressure and/or rear axle braking demand pressure than the front axle braking demand pressure and/or rear axle braking demand pressure demanded by the electronic braking demand signal.

15. The vehicle of claim 14, wherein the vehicle is a utility vehicle.

16. The electrically controllable pneumatic brake system of claim 2, wherein the vehicle is a utility vehicle.

17. A vehicle comprising:
an electrically controllable pneumatic brake system having a front axle brake circuit for a front axle of the vehicle, said front axle brake circuit having a first compressed air supply and a plurality of front axle brake actuators;
said electrically controllable pneumatic brake system further having a rear axle brake circuit for at least one rear axle of the vehicle, said rear axle brake circuit having a second compressed air supply and a plurality of rear axle brake actuators;
said electrically controllable pneumatic brake system including a brake signal transmitter and a two-channel pressure modulator;
said brake signal transmitter being configured to be actuated manually;
said brake signal transmitter being connected to said first compressed air supply and to said second compressed air supply and being configured to, upon actuation, output a first front axle brake control pressure and a first rear axle brake control pressure;
said front axle brake circuit having a front axle relay valve which is connected to said first compressed air supply and is configured, upon receipt of a front axle braking demand pressure, to output a front axle brake pressure to the front axle brake actuators;
said rear axle brake circuit having a rear axle relay valve which is connected to said second compressed air supply and is configured, upon receipt of a rear axle braking demand pressure, to output a rear axle brake pressure to said plurality of rear axle brake actuators;
said two-channel pressure modulator system being connected between said brake signal transmitter and said front and rear axle relay valves;
said two-channel pressure modulator system being configured to receive an electronic braking demand signal from a unit for autonomous driving and, in response thereto, to output the front axle braking demand pressure and the rear axle braking demand pressure;
said two-channel pressure modulator system being further configured to receive the first front axle brake control pressure and the first rear axle brake control pressure and, at least in a fault situation of an electronic component of said pressure modulator system, to output at least one of the front axle braking demand pressure in dependence upon the first front axle brake control pressure and the rear axle braking demand pressure in dependence upon the first rear axle brake control pressure;
said two-channel pressure modulator system having, for a first channel, a first primary modulator and a first secondary modulator which are pneumatically connected in series; and,
said two-channel pressure modulator system having, for a second channel, a second primary modulator and a second secondary modulator which are pneumatically connected in series.

18. The vehicle of claim 17, wherein the vehicle is a utility vehicle.

\* \* \* \* \*